United States Patent
Lang

(10) Patent No.: US 6,868,368 B1
(45) Date of Patent: Mar. 15, 2005

(54) METHOD FOR IMPROVING THE CONTROL OF POWER PLANTS WHEN USING INPUT/LOSS PERFORMANCE MONITORING

(75) Inventor: Fred D Lang, San Rafael, CA (US)

(73) Assignee: Exergetic Systems, LLC, San Rafael, CA (US)

( * ) Notice: Subject to any disclaimer, the term of this patent is extended or adjusted under 35 U.S.C. 154(b) by 103 days.

(21) Appl. No.: 10/357,905

(22) Filed: Feb. 3, 2003

Related U.S. Application Data

(63) Continuation-in-part of application No. 10/131,932, filed on Apr. 24, 2002, now Pat. No. 6,745,152, which is a continuation-in-part of application No. 10/087,879, filed on Mar. 1, 2002, now Pat. No. 6,714,887, which is a continuation-in-part of application No. 09/630,711, filed on Aug. 2, 2000, now Pat. No. 6,584,429, which is a continuation-in-part of application No. 09/273,711, filed on Mar. 22, 1999, now Pat. No. 6,522,994, which is a continuation-in-part of application No. 09/047,198, filed on Mar. 24, 1998, now abandoned.

(60) Provisional application No. 60/147,717, filed on Aug. 6, 1999.

(51) Int. Cl.$^7$ .................................................. G06F 9/30
(52) U.S. Cl. ...................... 702/188; 702/179; 702/182; 702/183
(58) Field of Search .............................. 702/30, 31, 45, 702/50, 136, 182, 183, 179, 188; 166/302; 585/1; 700/285; 122/10

(56) References Cited

U.S. PATENT DOCUMENTS

| | | | | | |
|---|---|---|---|---|---|
| 4,445,180 A | * | 4/1984 | Davis et al. | ................. | 700/289 |
| 4,817,711 A | * | 4/1989 | Jeambey | ..................... | 166/248 |
| 6,149,814 A | * | 11/2000 | Allington et al. | ........... | 210/634 |
| 6,522,994 B1 | * | 2/2003 | Lang | .......................... | 702/183 |
| 6,584,429 B1 | * | 6/2003 | Lang | .......................... | 702/182 |
| 6,745,152 B1 | * | 6/2004 | Lang | .......................... | 702/183 |

* cited by examiner

Primary Examiner—Patrick Assouad
Assistant Examiner—Felix Suarez

(57) ABSTRACT

This invention relates to a fossil-fired thermal system such as a power plant or steam generator, and, more particularly, to a method for improving the control of a power plant or steam generator through use of computed output obtained from any of the Input/Loss methods. Typically such computed output may consist of As-Fired fuel flow, fuel heating value, fuel Firing Correction, and other similar terms which might effect the operating control system of a power plant or steam generator.

22 Claims, 1 Drawing Sheet

METHOD FOR IMPROVING THE CONTROL OF POWER PLANTS WHEN USING INPUT/LOSS PERFORMANCE MONITORING

This application is a Continuation-In-Part of U.S. patent application Ser. No. 10/131,932 filed Apr. 24, 2002 now U.S. Pat. No. 6,745,152, which is a Continuation-In-Part of U.S. patent application Ser. No. 09/273,711 filed Mar. 22, 1999 which issued on Feb. 18, 2003 as U.S. Pat. No. 6,522,994, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, now abandoned.

This application is also a Continuation-In-Part of U.S. patent application Ser. No. 09/630,853 filed Aug. 2, 2000 which issued on Jun. 24, 2003 as U.S. Pat. No. 6,584,429, for which priority is claimed and is incorporated herein by reference in its entirety; application Ser. No. 09/630,853 claims the benefit of U.S. Provisional patent application Ser. No. 60/147,717 filed Aug. 6, 1999.

This application is also a Continuation-In-Part of U.S. patent application Ser. No. 10/087,879 filed Mar. 1, 2002 which issued on Mar. 30, 2004 as U.S. Pat. No. 6,714,877, for which priority is claimed and is incorporated herein by reference in its entirety; application Ser. No. 10/087,879 which, in turn, is a Continuation-In-Part of U.S. patent application Ser. No. 09/273,711 filed Mar. 22, 1999 which issued on Feb. 18, 2003 as U.S. Pat. No. 6,522,994, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, now abandoned.

This invention relates to a fossil-fired thermal system such as a power plant or steam generator, and, more particularly, to a method for improving the control of a power plant or steam generator through use of computed output obtained from any of the Input/Loss methods. Typically such computed output may consist of As-Fired fuel flow, fuel heating value, fuel Firing Correction, Energy Released from Combustion, and other similar terms which might effect the operating control system of a power plant or steam generator.

BACKGROUND OF THE INVENTION

Although especially applicable to "The Input/Loss Method" as installed at coal-fired power plants, this invention may be applied to any on-line monitoring method and any other of the "Input/Loss methods", installed at any thermal system burning a fossil fuel. Such monitoring is assumed to be conducted in a continuous manner (i.e., on-line), processing one monitoring cycle after another, each cycle includes determining stoichiometric balances of the combustion process and, specifically, the fuel's heating value. Specifically, The Input/Loss Method and its associated technologies are described in the following United States patent applications and resulting patents: Ser. No. 09/273,711 which issued on Feb. 18, 2003 as U.S. Pat. No. 6,522,994 (hereinafter termed '994): Ser. No. 09/630,853 which issued on Jun. 24, 2003 as U.S. Pat. No. 6,584,429 (hereinafter termed '429) and Ser. No. 10/087,879 filed on Mar. 1, 2002 which issued on Mar. 30, 2004 as U.S. Pat. No. 6,714,877 (hereinafter termed '877). One of the Input/Loss methods, a rudimentary method, is described in U.S. Pat. No. 5,367,470 issued Nov. 22, 1994 (hereinafter termed '470), and in U.S. Pat. No. 5,790,420 issued Aug. 4, 1998 (hereinafter termed '420).

Most fossil-fired thermal systems are controlled through Distributed Control. Systems (termed DCS). There are two major functional control operations within the DCS structure associated with a power plant: the control of the steam generator (the boiler), and the control of the turbine cycle. Control of the steam generator is accomplished through the so-called Boiler Master, a designated portion of the DCS. Control of the turbine cycle (and specially the steam turbine proper) is accomplished through the so-called Turbine Master, a designated portion of the DCS.

Typically the DCS may control the system using one of three modes, selected by the system operator: a Boiler Follow Mode, a Turbine Follow Mode, or a Fully Coordinated Mode. In a Boiler Follow Mode the boiler is slave to the load demands on the system by controlling the fuel firing rate such that the turbine throttle pressure is held to a desired set point. In a Turbine Follow Mode the turbine's throttle values are adjusted to control throttle pressure (i.e., the inlet pressure to the steam turbine). Typically, a power plant employs the Boiler Follow Mode. Turbine Follow Mode may be employed when the system is reducing load, or when a highly stabilized boiler operation is desired; turbine output will vary. When using the Fully Coordinated Mode the fuel firing rate is adjusted to control throttle pressure while, at the same time, the throttle valves are adjusted to control useful output from the system. As is typical with most DCS control logic, the absolute values of system parameters, such as fuel flow, combustion air flow throttle pressure and the like, are not required; only their relative, sealed, values. High consistency in such signals is, not only desired, but required for stable operation. For example, if the system indication of fuel flow is inconsistent, producing discontinuities in the signal and/or producing opposing trends versus the actual, unstable operations with dangerous results to equipment and personnel may be expected.

In addition to the requirement of obtaining consistent signals used by the DCS, when the system operator changes control modes, the DCS must response in a seamless manner. This is to say, for example, that when changing from a Boiler Follow Mode to a Turbine Follow Mode, the operation of the power plant should not become unstable. In cases when any instability exceeds design limits, the system will trip off-line, causing loss of all useful output. If the system is tripped from a high load, this most likely will cause considerable stress on materials and shorten fatigue life of equipment. Industrial art has developed a technique whereby changes in control modes may be made more seamless through the use of a numerical input to the DCS termed a "Btu-Compensator". Typically the Btu-Compensator value is the heating value of the fuel. Use of the Btu-Compensator is intended to maintain a constant output from the Boiler Master such that the Boiler Master may trim controls of the system from a point which is common to all operational modes; modes of Boiler Follow, Turbine Follow and Fully Coordinated. Such a common point used for trim control implies seamless transitions between modes. Typically, the Btu-Compensator value is either input by the operator, or, and most commonly, is left as a constant value. If input by the operator, the Btu-Compensator value is based on his/her guess, laboratory analysis of the fuel (which may be many days old), the control engineer's judgement, or from an on-line instrument analyzer of the fossil fuel. Use of an on-line instrument analyzer may have functionality in supplying the Btu-Compensator, but in general these instruments are not reliable and thus have not received acceptance by the power industry.

The industrial art of controlling power plants and fossil combustion is well established. It relies on direct instrumentation of process streams; for example, the flow of fuel (e.g., coal flow), the flow of combustion air, pressure measurements, the sensing of valve positions, etc. In coal-fired power plants, fuel flow is commonly measured using scales placed on conveyer belts. Combustion air flow is measured using pitot tubes. Throttle pressure is measured using pressure sensors. Such measurement techniques are considered common art, having been established over 120 years of producing commercial electrical power. However, needed by the power industry are methods which improve DCS performance and control of fossil-fired thermal systems, such as power plants or steam generators, and specifically improvements to the consistency of base signals employed by the DCS and improvements in DCS stability when transitioning between operational modes.

The patents '470 and '420 make no mention of the use of parameters which may be used in power plant control systems. Although the technologies of '994 and '429 support this invention, they make no mention of parameters which may be used in control systems. The technology of '877 supports and adds to the technologies of '994 and '429 and thus supports this invention. Although the methods of '994 and '429 are highly useful, the present invention further improves these methods as applied to power plant control systems and systems burning fossil fuels. There is no known art related to this invention.

SUMMARY OF THE INVENTION

This invention relates to a fossil-fired thermal system such as a power plant or steam generator, and, more particularly, to a method to improve the control of such fossil-fired thermal systems. This invention employs computational outputs produced from any of the Input/Loss methods, as direct input to Distributed Control Systems used by fossil-fired thermal systems such that improvements to the consistency of base signals employed by the DCS and improvements in DCS stability when transitioning between operational modes may be achieved. The use of such values internal to the DCS is not altered by this invention, however the supply of such values as taught herein is unique.

The present invention teaches the mechanism of how base signals supplied to the DCS may originate from one of the Input/Loss methods.

Other objects and advantages of the present invention will become apparent when its general methods are considered in conjunction with the accompanying drawing and the related inventions of '994 and '429.

DESCRIPTION OF THE PREFERRED EMBODIMENT

Figure 1:
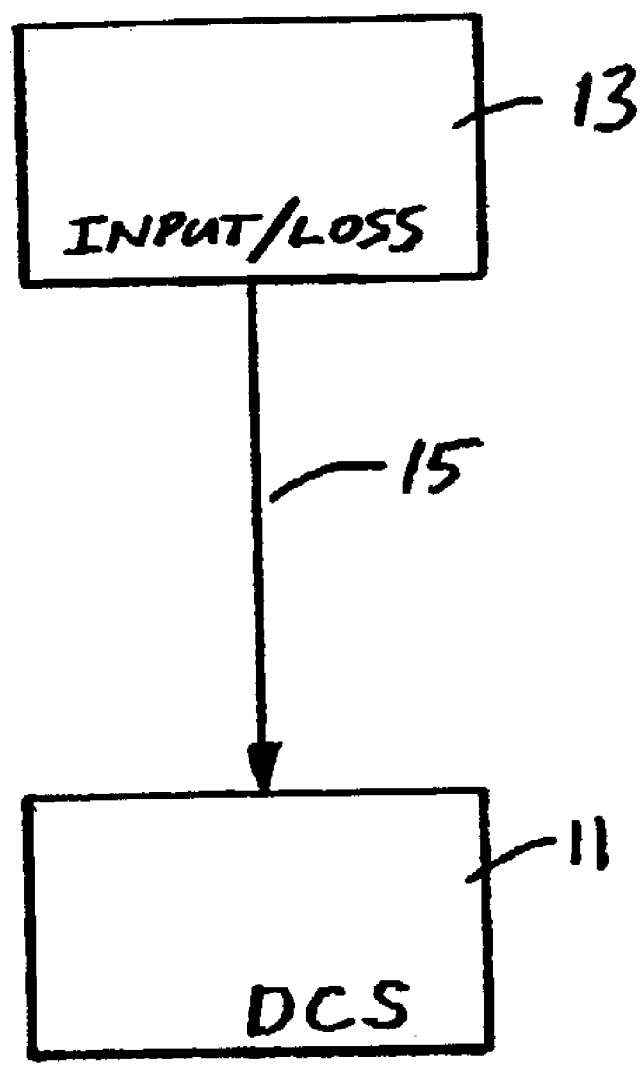
FIG. 1 is a block representation of a fossil-fired thermal system's Distributed Control System receiving data from one of the Input/Loss methods.

To assure an appropriate teaching of this invention, its description is divided by sub-sections. The first presents nomenclature, definitions of equation terms, typical units of measure, and meaning of terms used herein (such as Choice Operating Parameters and System Effect Parameters). The next sub-sections teach specific methods. The use and understanding of multidimensional minimization techniques, leading to correction factors applied to Choice Operating Parameters which in turn are required by any of the Input/Loss methods, is fully taught in '877. Although the details of computations leading to a Btu-Compensator, fuel flow and other values employed by the DCS as taught by this invention are explained herein, they are fiber explained in '994 and '429 and related provisional patent applications and Continuation-In-Parts.

Definitions of Equation Terms with Typical Units of Measure

Stoichiometric Terms:

a=Moles of combustion $O_2$ input to the system; moles/base.

aβ=Moles of $O_2$ entering with system air leakage (typically via the air pre-heater); moles/base.

$A_{Act}$=Molar fraction of $O_2$ in combustion air local to (and entering) the system; molar ratio.

$b_A$=Moles of moisture in the entering combustion air, moles/base.

$b_A$β=Moles of moisture entering with system air leakage; moles/base.

$b_Z$=Moles of water (as steam or liquid) in-leakage entering and mixing with the combustion gases; moles/base.

$b_{PLS}$=Moles of Pure LimeStone ($CaCO_3$) required for zero CaO production; moles/base.

$N_k$=Molecular weight of substance k; as examples: $N_{AF}$= $N_{Fuel}$=Molecular weight of the As-Fired fuel; $N_{MAF\text{-}Ref}$= Molecular weight of the MAF reference fuel associated with $HHV_{MAF\text{-}Ref}$, see Eq. (7); $N_{MAF\text{-}Act}$=Molecular weight of the actual fuel on a MAF base.

$R_{Act}$=Ratio of moles of dry gas from the combustion process before entering the air pre-heater to gas leaving, defined as the Air Pre-Heater Leakage Factor; molar ratio.

x=Moles of As-fired fuel required for 100 moles of dry gas product; note: $\Sigma n_i$=100 moles of dry gas product at the Stack is the assumed calculational base; moles/base.

$\alpha_k$=As-Fired (wet-base) moles of fuel chemistry constituent k per mole of fuel, where:

$\Sigma \alpha_k$=1.0, where k=1 thru 10: k=1 for nitrogen, k=2 for water, k=3 for oxygen, k=4 for carbon, k=5 for hydrogen, k=6 for sulfur, k=7, 8, 9 are not used, and k=10 for fuel mineral matter (commonly termed ash); moles/mole-fuel.

$\alpha_{MAF\text{-}k}$=Moisture-Ash-Free (MAF) moles of fuel constituent k per mole of MAF fuel:

$\Sigma \alpha_{MAF\text{-}k}$=1.0, where k=1,3,4,5,6 (see $\alpha_k$ for nomenclature); moles/mole-fuel.

β=Air Pre-Heater Dilution Factor (ratio of air leakage to true combustion air); molar ratio β≡100 $(R_{Act}-1.0)/[aR_{Act}(1.0+\phi_{Act})]$ γ=Molar ratio of excess $CaCO_3$ to its stoichiometric requirements (e.g., γ=0.0 if no CaO is found in the effluent); molar ratio.

$\phi_{Act}$=Ratio of non-oxygen gases ($N_2$ and Ar) to oxygen in the combustion air; molar ratio.

$\phi_{Act}$≡$(1.0-A_{Act})/A_{Act}$.

Quantities Related to System Terms:

$AF_{Act}$=Air/Fuel ratio defined by the (actual) indicated mass flow rate of air entering the combustion process and $m_{AF\text{-}PLT}$; unitless mass ratio.

BBTC=Energy flow to the working fluid from combustion gases; Btu/hr.

$C_{P\text{-}Fuel}$=Specific heat of the As-Fired fuel; Btu/lbm-°R.

$C_{P\text{-}PLS}$=Specific heat of pure limestone, $CaCO_3$; Btu/lbm-°R

ERC'=Defined as the Specific Energy Released from Combustion, per pound of As-Fired fuel; Btu/$lbm_{AF}$.

ERC=Energy Released from Combustion, an energy flow term; Btu/hr.

=$m_{AF}(-HPR_{Act\text{-}HHV}+HRX_{Act\text{-}HHV})$ $HPR_{Act\text{-}HHV}$=Enthalpy of Products from actual combustion (HHV-based); Btu/$lbm_{AF}$.

$HPR_{Ideal}$=Enthalpy of ideal products associated with the determination of HHV referenced to $T_{cal}$; Btu/lbm$_{AF}$.

$HRX_{Act-HHV}$=Enthalpy of Reactants of the actual As-Fired fuel (HHV-based); Btu/lbm$_{AF}$.

$HRX_{Cal-HHV}$=Enthalpy of Reactants at $T_{Cal}$(HHV-based); Btu/lbm$_{AF}$.

≡HHVP+HPR$_{Ideal}$ $h_{Amb-Air}$=Specific enthalpy of ambient dry air at $T_{Amb}$; Btu/lbm.

$h_{Cal-Amb}$=Specific enthalpy of dry air evaluated at $T_{Cal}$; Btu/lbm.

$h_{g-Amb-H2O}$=Saturated vapor specific enthalpy of water at the dry bulb temperature, $T_{Amb}$; Btu/lbm.

$h_{Steam}$=Specific enthalpy of steam or liquid water leakage to combustion space; Btu/lbm.

$h_{f-Cal-H2O}$=Saturated liquid specific enthalpy of water at $T_{Cal}$; Btu/lbm.

HBC≡Firing Correction; Btua/lbm$_{AF}$.

HHV≡As-Fired higher heating value as determined either by computation (for gaseous fuels), or by laboratory measurement in a constant volume bomb calorimeter (for liquid or solid fuels); Btu/lbm$_{AF}$.

HHV$_{calc}$=As-Fired higher heating value as computed by any of the Input/Loss methods; Btu/lbm$_{AF}$.

HHVP=As-Fired higher heating value, based on HHV or HHV$_{calc}$, and used in system evaluations as corrected for a constant pressure process; Btu/lbm$_{AF}$.

HNSL=Specific enthalpy of the boiler's "non-chemistry & sensible heat loss" terms (the sensible heat of non-combustion processes associated with system outflows); Btu/lbm$_{AF}$.

HR=System heat rate (higher heating value-based), also termed unit heat rate; Btu/kWh.

≡3412.1416/$\eta_{System}$ $m_{AF}$=Fuel flow rate, an As-Fired mass flow quantity (i.e., wet with water and fuel mineral matter), as computed by any of the Input/Loss methods; lbm$_{AF}$/hour.

$m_{AF-PLT}$=The system's measured fuel flow, an As-Fired quantity (i.e., wet with water and fuel mineral matter), also termed the system's "indicated fuel flow"; lbm$_{AF}$/hour.

$P_{Amb}$=Ambient pressure local to the system, psiA.

$Q_{SAH}$=Energy flow delivered to steam/air heaters, Btu/hr.

$T_{Amb}$=Ambient temperature local to the system, F.

$T_{Cal}$=Calorimetric temperature to which heating value is referenced, F.

$T_{AF}$=As-Fired fuel temperature, F.

$W_{output}$=Gross power generated from a power plant; kWe.

$WF_2$=Weight fraction of fuel water on a wet base; lbm-Water/lbm-As-Fired Fuel.

$WF_{dry}$-10=Weight fraction of fuel mineral matter on a dry base; lbm-Ash/lbm-dry-Fuel.

$W_{FD}$=Brake power associated with inflow stream fans (e.g., Forced Draft fans) within the system boundary, Btu/hr.

$\eta_{B-HHV}$=Boiler efficiency (higher heating value-based); unit-less.

Subscripts and Abbreviations:

Act=Actual value determined from the operating thermal system.

AF=As-Fired fuel at the thermodynamic boundary (i.e., wet with water and mineral matter).

Dry=Dry chemical base (i.e., free of water).

MAF=Moisture-Ash-Free chemical base (i.e., free of water and free of mineral matter).

Ref=Reference value.

PLS=Pure limestone, $CaCO_3$.

Meaning of Terms

As used herein, the meaning of the words "Operating Parameters" refers in general to common data obtained from a thermal system applicable to the thermodynamic understanding of that system. The following quantities are included in the definition of Operating Parameters, they are not encompassing but considered typical of a minimum set of data required for thermodynamic understanding. Effluent $CO_2$, $O_2$, and $SO_2$ concentrations are determined at the Stack, or before the air pre-heater (Boiler side of the air pre-heater). The mass, wet-base ratio of the indicated combustion air flow at the system's fuel combustors, to the system's indicated fuel flow, termed $AF_{Act}$ may be required; measurements made on a volume base, or a dry-base, then converted to a mass, wet-base. Effluent $H_2O$ concentration measurement is required, or assumptions made (or as otherwise may be determined). Effluent temperature measurement is required, that is the average temperature associated with the combustion gases at the system boundary (caution must be exercised in measuring non-stratified gas flows). The inlet/outlet ratio of $CO_2$ (preferred), CO, or $O_2$ across the air pre-heater (these could be obtained off-line, based on periodic testing or judgement) is required, whose measurement is used for the determination of air pre-heater leakage using the $R_{Act}$ and β terms. Determination of fuel temperature at an appropriate system boundary is required. Air psychrometric measurements are required, or as otherwise determined, at the system boundary (e.g., dry and wet bulb temperatures, or dry bulb and relative humidity, or dry bulb and dew point temperatures). Quantities comprising the system's Firing Correction, HBC, should be determined. The discharge temperatures of the air as it exits each air beating or cooling device (but before it reacts with the fuel) are required; for example, such devices might include the air pre-heater, forced-draft fan, steam-to-air heater, etc. Measurements are required to determine the total energy flow deposition to the working fluid from the combustion gases (termed BBTC, in typical units of measure of Btu/hr). For a power plant, such measurements typically include feedwater flow to the steam generator, feedwater pressure and temperature, determination of the steam flow from the steam generator if different than the feedwater flow, steam pressure, steam temperature or quality (or assumed quality), and, if applicable, reheat flows, and reheat inlet and outlet pressures and temperatures. For a conventional power plant, determination of accurate reheat flows generally requires understanding of steam turbine flow distributions (involving high pressure turbine shaft seals, steam flows to feedwater heaters, turbine bypass leakages, attemperation spray flows and the like).

As used herein, the meaning of the words "Choice Operating Parameters" refers to a sub-set of Operating Parameters with additional but related terms. Choice Operating Parameters are parameters which may be optimized, that is the process in which errors in these parameters are reduced by application of correction factors as taught in '877. These parameters are selected by the user from an available set. In the preferred embodiment, the available set of Choice Operating Parameters is herein defined as the being the following eight: 1) effluent $CO_2$ concentration measured at the Stack or Boiler, 2) $H_2O$ concentration measured, or as otherwise may be determined, at the Stack or Boiler, 3) the mass, wet-base ratio of the indicated combustion air flow at the system's fuel combustors, to the system's indicated fuel flow, termed $AF_{Act}$; 4) the Air Pre-Heater Leakage Factor, termed $R_{Act}$; 5) the concentration of $O_2$ in the combustion air local to the system, or as otherwise determined, termed $A_{Act}$ (leading to the determination $\phi_{Act}$); 6) the system's indicated limestone mass flow rate, termed $m_{LS}$; 7) effluent $O_2$ concentration measured at the Stack or Boiler; and 8) mass flow rate associated with a heat exchanger tube leakage flow rate, termed $m_T$.

As used herein, the meaning of the words "CEMS Data" refers to yet another sunset of Operating Parameters. Although the exclusive use of CEMS Data as input to one of the Input/Loss methods is not the preferred embodiment said data still may be useful and may be important when applying the teachings of this invention. CEMS Data implies data which typically originates from the Continuous Emission Monitoring System associated with a fossil-fired thermal system and includes at least one of the following: a) effluent $CO_2$ concentration measured at the Stack or Boiler, and/or b) effluent $O_2$ concentration measured at the Stack or Boiler, and/or c! effluent $SO_2$ concentration measured at the Stack or Boiler.

As used herein, the meaning of the words "Reference Fuel Characteristics" includes an average or typical fuel chemistry and associated MAF heating value, preferably based on historical data collections of ultimate analyses of the fuel's elementary composition, with fuel water and fuel ash (typically reported as weight fractions summing to unity, leading to ak molar fractions), herein termed fuel chemistry constituents.

As used herein, the meaning of the words "Input/Loss methods" refers to any method or combination of methods in which one or more of the following parameters is determined based on a selection of Choice Operating Parameters, and/or CEMS Data, and/or Operating Parameters: fuel flow, effluent flow, emission rates, fuel chemistry, fuel heating value, boiler efficiency and/or system heat rate. In addition to '994, '429 and '877 and their related provisional patent applications and Continuation-In-Parts, Input/Loss methods include the methods of '470 and '420. The words "The Input/Loss Method" refers uniquely to the collection of technologies described in '994, '429 and '877, and their related provisional patent applications and Continuation-In-Parts. Note that The Input/Loss Method employs Choice Operating Parameters and Operating Parameters in determining fuel flow, effluent flow, emission rates, fuel chemistry, fuel heating value, boiler efficiency and system heat rate.

As used herein, if used, the words "obtain", "obtained", "obtaining", "determine", "determined", "determining", "determination", "establish", "established" or "establishing" are defined as measuring, calculating, computing, assuming, estimating or gathering from a database.

As used herein, the words "monitoring" or "monitored" are meant to encompass both on-line monitoring (i.e., processing system data in real time) and off-line monitoring (i.e., computations involving static data). A "monitoring cycle" is meant one execution of the processes associated with any one of the Input/Loss methods.

As used herein, the meaning of the words "smoke Stack" or "Stack" or "system boundary" are defined as the physical boundary of the thermal system where gaseous combustion effluents exit, entering the local environment. Solid effluents not leaving the Stack (e.g, ash from ash removal equipment) are referenced to the system's generic boundary.

As used herein, the meaning of the word "indicated" when used in the context of data originating from the thermal system is defined as the system's actual and uncorrected measurements of a physical process (e.g., pressure, temperature, mass flow, volumetric flow, density, and the like) whose accuracy or inaccuracy is not assumed. As examples, a system's "indicated fuel flow" or its "indicated limestone flow" denote system measurements the accuracy of which is unknown (they are "as-is", with no judgement applied). Such indicated measurements are said to be either correctable or not. If not correctable, it may be the associated computed value from Input/Loss methods tracks the indicated value over time (the indicated not being corrected per se).

Fuel Flow Rate Input to the Boiler Master

When a fossil-fired thermal system employs on-line monitoring using one of the Input/Loss methods, each monitoring cycle produces a fuel flow. For the preferred embodiment herein, and as associated with The Input/Loss Method, fuel flow is back-calculated from the basic boiler efficiency equation given by the following:

$$\eta_{B-HHV}=BBTC/[(m_{AF}(HHVP+HBC)] \quad (1)$$

In any of the Input/Loss methods, boiler efficiency associated with higher heating value computations, $\eta_{B-HHV}$, is determined independent of mass or energy flows. In the preferred embodiment, boiler efficiency is determined using the teachings of '429. However, after obtaining $\eta_{B-HHV}$ independent of Eq. (1), the terms of Eq. (1) may then be re-arranged to yield a computed fuel flow:

$$m_{AF}=BBTC/[\eta_{HHV}(HHVP+HBC)] \quad (2)$$

In general, any one of the Input/Loss methods may choose to compute boiler efficiency, and thus fuel flow without use of a Firing Correction term (HBC):

$$m_{AF}=BBTC/[\eta_{B-HHV}HHVP] \quad (3)$$

Further still, any one of the Input/Loss methods may choose to compute a so-called "fuel efficiency", where: $\eta_{B-HHV}=$ (HHV$_{calc}$–Losses)/HHV$_{calc}$; without use of a Firing Correction term (HBC) nor correcting the heating value from a constant volume to a constant pressure process, or combinations thereof. Using this approach, fuel flow is computed by the following:

$$m_{AF}=BBTC/[\eta_{B-HHV}HHV_{calc}] \quad (4)$$

However, no matter the details employed, Input/Loss methods which compute a heating value of the fossil fuel, and boiler efficiency ($\eta_{B-HHV}$) independent of mass and energy flows, then allows the computation of fuel flow knowing the energy flow input to the working fluid (BBTC).

A fuel flow, $m_{AF}$, computed on-line by any one of the Input/Loss methods, and as taught herein, allows its use by the plant's Boiler Master for control purposes. Where ever the Boiler Master employs a plant's indicated fuel flow, $m_{AF-PLT}$, this invention teaches to employ the computed fuel flow, $m_{AF}$. Input/Loss methods which compute fuel chemistry on-line, and use that fuel chemistry to determine heating value, and with heating value and fuel chemistry determine boiler efficiency, inherently reflect the system's thermodynamic processes. This invention recognizes this unique reflection: that a fuel flow computed by Input/Loss methods reflects the actual fuel chemistry being burned, reflects the actual heating value being consumed by the system, and reflects the actual ratio of useful output to fuel energy (boiler efficiency). Thus a fuel flow computed by Input/Loss methods is ideally suited as input to a Boiler Master.

Further, it is important to recognize that a fuel flow computed by Input/Loss methods, as used for input to the Boiler Master, also reflects the system's overall heat rate:

$$HR = m_{AF}(HHVP + HBC)/W_{output} \quad (5)$$

$$= BBTC/(\eta_{B-HHV} W_{output}) \quad (6)$$

where heat rate, HR, may also be computed as: $m_{AF}HHVP/W_{output}$; or: $m_{AF}HHV_{calc}/W_{output}$.

Btu-Compensator Input to the Boiler Master

For the preferred embodiment of this invention, fossil fuel heating value is determined by calculating the differential effects between a Moisture-Ash-Free (MAF) reference heating value versus an actual MAF fuel chemistry. The As-Fired fuel chemistry could be used to produce the MAF chemistry, or it being otherwise obtained. The heating value calculation involves use of a correlation relating oxygen, carbon, hydrogen and sulfur contents to a MAF heating value, correcting for ash to obtain a dry-base heating value, then finally correcting for water to obtain the As-Fired value. In the preferred embodiment, the calculated As-Fired value ($HHV_{calc}$) is then corrected for a constant pressure process if appropriate (HHVP). Further, the Firing Correction term, HBC, is then added to HHVP, yielding the total specific energy content of the fuel in the As-Fired state.

For the preferred embodiment of this invention, the heating value correlation is scientifically based on the chemical binding energies between hydrocarbon elements. The correlation is taken from the works of Ghamarian & Cambel, which is based in-part on the well known work of Szargut and Szargut & Stryrylska The references include: A. Ghamarian & A. B. Cambel, "Energy/Exergy Analysis of Pressurized Fluidized Bed Combustor", Proceedings of the Intersociety Energy Conversion Engineering Conference, Aug. 8–12, 1982, pp. 323–327; A. Ghamarian & A. B. Cambel, "Exergy Analysis of Illinois No. 6 Coal", Energy, Vol. 7, No. 6, 1982, pp. 483–488; J. Szargut, "International Progress in Second Law Analysis", Energy, Vol. 5, 1980, pp. 709–718; and J. Szargut & T. Stryrylska, "Approximate Determination of the Exergy of Fuels", Brennstoff-Warne-kraft, Vol. 16, No. 12, December 1964, pp. 589–596. The correlation is accurate to within ±0.7 percent $\Delta HHV_{MAF-Ref}$ deviation for over four dozen short- and long-chained hydrocarbon compounds. For hydrocarbons like coal, demonstrated below, normally having a low oxygen content, the correlation's accuracy is estimated at +0.5 percent. A similar correlation by the same authors exists for hydrocarbons with high oxygen content. To further reduce these errors, The Input/Loss Method computes a term $\Delta HHV_{MAF-delta}$ based on a reference MAF-base heating value, $HHV_{MAF-Ref}$, and the reference concentrations of oxygen, carbon, hydrogen and sulfur (established during initialization). The term $\Delta HHV_{MAF-uncorr}$ is computed via Eq. (8) based on actual MAF fuel concentrations determined using Input/Loss methods, or otherwise determined. Using Eqs. (9), (10) and (11) the computed on-line As-Fired heating value, $HHV_{calc}$, is resultant. The term $N_{MAF}$ is the molecular weight of the MAF-base fuel (without water and ash), either for the reference fuel or for the actual.

$$\Delta HHV_{MAF-delta} = HHV_{MAF-Ref}(-178387.18\alpha_{MAF-3} + 183591.92\alpha_{MAF-4} + 78143.68\alpha_{MAF-5} + 127692.00\alpha_{MAF-6})_{Ref}/N_{MAF-Ref} \quad (7)$$

$$HHV_{MAF-uncorr} = (-178387.18\alpha_{MAF-3} + 183591.92\alpha_{MAF-4} + 78143.68\alpha_{MAF-5} + 127692.00\alpha_{MAF-6})_{Actual}/N_{MAF-Actual} \quad (8)$$

$$HHV_{MAF} = HHV_{MAF-uncorr} + \Delta HHV_{MAF-delta} \quad (9)$$

$$HHV_{dry} = HHV_{MAF}(1.0 - WF_{dry-10}) \quad (10)$$

$$HHV_{calc} = HHV_{dry}(1.0 - WF_2) \quad (11)$$

Reference fuel chemistry and heating values are determined as a portion of the Reference Fuel Characteristics.

If a correction for a constant pressure process (HHVP) is required, based on the computed $HHV_{calc}$, this correction may be made using procedures of the American Society of Mechanical Engineers (ASME) in their Performance Test Codes (PTC), and particularly PTC 4.1, or similar industrial standards and is common art; such conversions are also taught in '429 which methods are exact and represent the preferred embodiment.

The preferred correlations used to determine heating values for the present invention are based on chemical binding energies. Studies have demonstrated that traditional correlations, such as the Mott-Spooner correlation based on Dulong's formula—well known in the industry—are not adequate. The preferred embodiment of the present invention requires at least the coefficients used in determining heating value to fall within certain ranges associated with three principal constituents of coal. Studies have indicated that using the above preferred constants, which fall within the required ranges, reduces the standard deviation of five dozen wildly varying coal analyses from ±228 to ±92 $\Delta$Btu/lbm. The ranges of these coefficients, i.e., multiples the molar fractions $\alpha_j$ in Eqs. (7) and (8), or their equivalent weight fractions (for this presentation of ranges, the symbol $WF_j$ represents percent weight of j), include the following:

for carbon molar fraction $174160\alpha_{Carbon}/N_{Fuel}$ to $184970\alpha_{Carbon}/N_{Fuel}$,
or in weight percent carbon, $145\ WF_{Carbon}$ to $154\ WF_{Carbon}$;

for hydrogen molar fraction $77610\alpha_{Hydrogen}/N_{Fuel}$ to $114910\alpha_{Hydrogen}/N_{Fuel}$
assuming molecular hydrogen, or in weight percent hydrogen,
$385 WF_{Hydrogen}$ to $570 WF_{Hydrogen}$;

and for oxygen molar fraction $-163190\alpha_{Oxygen}/N_{Fuel}$ to $-182390\alpha/N_{Fuel}$ assuming
molecular oxygen, or in weight percent oxygen,
$-51 WF_{Oxygen}$ to $-57 WF_{Oxygen}$.

These ranges, as expressed for the molar quantities, are based on MAF molar fuel fractions as indicated in Eqs. (7) & (8), but may be converted to a dry or As-Fired base; in like manner ranges expressed for the weight fractions are based on MAF weight fuel fractions, but may be converted to a dry or As-Fired base as done in Eqs. (10) and (11).

The Firing Correction term, HBC, used in the preferred embodiment of Eqs. (1) & (2), may be determined from the following relationship:

$$HBC \equiv C_{P-Fuel}(T_{AF} - T_{Cal}) + (Q_{SAH} + W_{FD})/m_{AF}$$
$$+ [(h_{Amb} - h_{Cal})_{Air} a(1.0\beta)(1.0 + \phi_{Act})N_{Air}$$
$$+ h_{g-Amb} - h_{g-Cal})_{H2O} b_A (1.0\beta)N_{H2O}$$
$$+ (h_{Steam} - h_{f-Cal})_{H2O} b_Z N_{H2O}$$
$$+ C_{P-PLS}(T_{Amb} - T_{Cal}) b_{PLS}(1.0 + \gamma)N_{CaCO3}]/(xN_{AF}) \quad (12)$$

Terms used in Eq. (12) are dependent on common Operating Parameters available using routine instrumentation common at any fossil-fired system. Also, these terms are discussed in ASME PTC 4.1 and 4, and other common industrial standards. The last term in Eq. (12) associated with limestone injection into the combustion process is presented for teaching illustration, it may, or may not, be employed by a given processes using this invention. In addition, the BBTC term, determined from Operating Parameters as based on commonly measured or determined working fluid mass flow rates, pressures and temperatures (or qualities).

Therefore having determined the fuel's heating value using Input/Loss methods, or using The Input/Loss Method described by Eqs. (7) through (11), leading to $HHV_{calc}$, it then may be used, uncorrected, as the Btu-Compensator employed by the system's DCS. In the preferred embodiment, $HHV_{calc}$ is corrected for a constant pressure process experienced by the actual combustion process, and for Firing Correction defined by Eq. (12). In summary the following represents an aspect of this invention, noting that HHVP is derived directly from $HHV_{calc}$:

$$\text{Btu-Compensator} = HHVP + HBC \qquad (13)$$

Note that Eq. (13) could easily be scaled to accommodate the specific input requirements of the DCS; e.g., scaling by a factor of 1.40, thus: Btu-Compensator=1.40(HHVP+ HBC). However, such scaling should be held constant as to not fault the sensitivities computed values of HHVP and HBC may have on the DCS.

For certain fossil combustion processes the Boiler Master of the DCS requires input as to the Energy Released from Combustion (ERC). ERC is the actual energy flow released by the fuel relative to the system, requiring use of the computed fuel flow. As an approximation, it may be estimated using either the heating value or the corrected heating value as discussed previously:

$$ERC \approx m_{AF} HHV_{calc} \qquad (14A)$$

$$ERC \approx m_{AF}(HHVP + HBC) \qquad (14B)$$

For some Boiler Masters, the Energy Released from Combustion is defined a specific energy term (in typical units of measure of Btu pr pound of As-Fired fuel termed the Specific Energy Released from Combustion or ERC') thus equivalent to the Btu-Compensator:

$$ERC' \approx HHV_{calc} \qquad (15A)$$

$$ERC' \approx HHVP + HBC \qquad (15B)$$

However, the most universal use of the Energy Released from Combustion quantity as might be used for controlling a fossil combustion process, for example as input to a Boiler Master, is defined by the difference between the Enthalpy of Products and the Enthalpy of Reactants. As such, this definition expresses the actual energy release local to the point of combustion, and is most useful for controlling a Fluidized Bed Combustion (FBC) process. In the preferred embodiment ERC is evaluated using techniques obtained from The Input/Loss Method in which ERC is integrated within the definition of boiler efficiency. The preferred embodiment for determining boiler efficiency, $\eta_{B-HHV}$, divides its definition into two components, a combustion efficiency ($\eta_{C-HHV}$) and boiler absorption efficiency ($\eta_A$). This is done such that an explicit calculation of the major terms, as solely impacting combustion efficiency, could be formulated. This invention teaches the separation of stack losses (treated by terms effecting combustion efficiency), from non-stack losses (treated by terms effecting boiler absorption efficiency).

$$\eta_{B-HHV} = \eta_A \eta_{C-HHV} \qquad (16)$$

To develop the combustion efficiency term, The Input/ Loss Method employs an energy balance uniquely about the flue gas stream (i.e., the combustion process). This balance is based on the difference in the Enthalpy of Products and the Enthalpy of Reactants. Actual, As-Fired, Enthalpy of Reactants is defined in terms of the Firing Correction and the enthalpy of reactants associated with ideal combustion (see definitions above): $HRX_{Act-HHV} = HRX_{Cal-HHV} + HBC$. Combustion efficiency is then defined by terms which are independent of fuel flow, as illustrated in Eq. (17) and as taught in '429.

$$\eta_{C-HHV} \equiv \frac{-HPR_{Act-HHV} + HRX_{Act-HHV}}{HHVP + HBC} \qquad (17)$$

This formulation was developed to maximize accuracy. Typically for coal-fired units, over 90% of the boiler efficiency's numerical value is comprised of $\eta_{C-HHV}$. All individual terms comprising $\eta_{C-HHV}$ have the potential of being determined with high accuracy. $HPR_{Act-HHV}$ is determined knowing effluent temperature, complete stoichiometric balances, and accurate combustion gas, air and water thermodynamic properties. $HRX_{Act-HHV}$ is dependent on $HPR_{Ideal}$, the measured heating value and the Firing Correction (HBC). HBC applies the needed corrections for the reactant's sensible heat: fuel, combustion air, limestone (or other sorbent injected into the combustion process if applicable), water in-leakage and energy inflows . . . all referenced to $T_{Cal}$. An example of the detailed development and use of these terms is presented in '429, and is incorporated herein by reference in its entirety.

The boiler absorption efficiency is developed from the boiler's "non-chemistry & sensible heat loss" term, HNSL, i.e., product sensible heat of non-combustion processes associated with system outflows. It is defined such that it, through iterative techniques, may be computed independent of fuel flow:

$$\eta_A \equiv 1.0 - \frac{HNSL}{-HPR_{Act-HHV} + HRX_{Act-HHV}} \qquad (18)$$

$$\equiv 1.0 - \frac{HNSL}{\eta_{C-HHV}(HHVP + HBC)} \qquad (19)$$

HNSL comprises radiation & convection losses, pulverizer rejected fuel losses (or fuel preparation processes), and sensible heats in: bottom ash, fly ash, effluent dust and effluent products of limestone (or other sorbent). HNSL is determined using the guidelines afforded in PTC 4.1's Heat-Loss Method. Although $\eta_A$ may be computed using techniques taught by The Input/Loss Method, for the purposes of control, it may be assumed constant. If such an assumption of constant $\eta_A$ is valid, a typical value for coal-fired systems is 0.97. The common range of the boiler absorption efficiency is 0.92 to 1.00, wherein unity indicates that the HNSL term is zero as taught by Eqs. (18) & (19). The preferred embodiment is to compute $\eta_A$ at every monitoring cycle using the techniques afforded in '429.

To develop an actual ERC input for the Boiler Master, Eq. (17) is substituted into Eq. (16), allowing ERC to be reduced:

$$\eta_{B-HHV} \equiv \frac{\eta_A(-HPR_{Act-HHV} + HRX_{Act-HHV})}{HHVP + HBC} \qquad (20A)$$

$$\equiv \frac{\eta_A(ERC)}{m_{AF}(HHVP + HBC)} \qquad (20B)$$

Therefore. ERC may be determined by either of the following equivalent expressions, noting that in the preferred embodiment all quantities on the right-hand sides of Eqs. (21A) or (21B) are computed at every monitoring cycle (i.e. using The Input/Loss Method):

$$ERC = m_{AF}(-HPR_{Act-HHV} + HRX_{Act-HHV}) \quad (21A)$$

$$ERC = m_{AF}(HHVP + HBC)\eta_{B-HHV}/\eta_a \quad (21B)$$

Although similar to the Btu-Compensator of Eq. (13), and to the simpler approximation of ERC presented in Eq. (14B), the sensitivity of Eqs. (21A) or (21B) local to the combustion process itself (given its dependency on boiler efficiency) makes it a preferred technique when dealing with FBC systems which are unusually sensitive to bed height and the conditions under which fuel is actually burned (i.e., described by: $-HPR_{Act-HHV} + HRX_{Act-HHV}$). Further, it becomes obvious that any boiler efficiency quantity may be employed by Eq. (21B) provided it is reasonably consistent. Thus although $\eta_{B-HHV}$ is dependent on $(-HPR_{Act-HHV} + HRX_{Act-HHV})$ in the preferred embodiment i.e. '429 and Eq. (20A). Eq. (21B) demonstrates ERC sensitivities assuming $\eta_{B-HHV}$ is obtained by methods other than those advocated in '429. $\eta_A$ may be computed or may be held constant. HHVP may be computed by any one of the Input/Loss methods. HBC may be computed as taught herein. It is further evident that Eq. (21B) may be employed in a simpler forms:

$$ERC = m_{AF} HHVP \eta_{B-HHV}/\eta_A \quad (22)$$

$$ERC = m_{AF} HHV \eta_{B-HHV}/\eta_A \quad (23)$$

Further still, although not common practice, the Specific Energy Released during Combustion (ERC') may be employed by some Boiler Masters and said use when taken in the context of this invention may assume a unity TA term. Such forms of the Specific Energy Released during Combustion may include, for example, any of the following:

$$ERC' = (HHVP + HBC)\eta_{B-HHV}/\eta_A \quad (24)$$

$$ERC' = HHVP \eta_{B-HHV}/\eta_A \quad (25)$$

$$ERC' = HHV \eta_{B-HHV}/\eta_A \quad (26)$$

$$ERC' \approx (HHVP + HBC)\eta_{B-HHV} \quad (27)$$

$$ERC' \approx HHVP \eta_{B-HHV} \quad (28)$$

$$ERC' \approx HHV \eta_{B-HHV} \quad (29)$$

Although the present invention has been described in considerable detail with regard to certain preferred embodiments thereof, other embodiments within the scope of the present invention are possible without departing from the scope, spirit and general industrial applicability of the invention. The method described is applicable to either higher heating value or lower heating value computations as supported by the teachings in '429. In addition, the fuel flow rate, Btu-Compensator, Specific Energy Released from Combustion and Energy Released from Combustion as inputs to the Boiler Master may be scaled to accommodate DCS input conventions, but such scaling should remain constant as to not fault the teachings of this invention. Accordingly, the general theme and scope of the appended claims should not be limited to the descriptions of the preferred embodiment disclosed herein. Further, aforementioned descriptions of this invention assume that a steam generator's working fluid is water, however the general procedures of this invention may be applied to any type of working fluid provided that the working fluid is measured (or otherwise assumed) at the boundary of the system. Examples of other working fluids are: mixtures of water and organic fluids, organic fluids, liquid metals and so-forth.

THE DRAWINGS

FIG. 1 is a block representation of a DCS, designated by 11, associated with a fossil-fired system which receives data from another process, designated by 13, employing one of the Input/Loss methods. The flow of data from 13 to 11, designated by 15, may consist of: computed fuel flow rate, Eq. (2); computed Btu-Compensator, Eq. (13); and/or computed Energy Released from Combustion, Eq. (21).

What is claimed is:

1. A method for quantifying the operation of a fossil-fired thermal system when being monitored by one of the Input/Loss methods through which improvement to the thermal system's Distributed Control System (DCS) is achieved, the method for quantifying the operation comprising the steps of:

calculating a fuel flow rate associated with the fossil-fired thermal system using one of the Input/Loss methods, resulting in a computed fuel flow rate, supplying the DCS with the computed fuel flow rate as an input signal, and controlling the fossil-fired thermal system in an improved manner through the DCS by making use of the computed fuel flow rate.

2. The method of claim 1, wherein the step of calculating the fuel flow rate, comprises a step of:

calculating the fuel flow rate associated with the fossil-fired thermal system using The Input/Loss Method, resulting in a computed fuel flow rate.

3. The method of claim 1, wherein the step of calculating the fuel flow rate, comprises a step of:

calculating the fuel flow rate associated with the fossil-fired thermal system using one of the Input/Loss methods which makes use of CEMS Data, resulting in a computed fuel flow rate.

4. A method for quantifying the operation of a fossil-fired thermal system when being monitored by one of the Input/Loss methods through which improvement to the thermal system's Distributed Control System (DCS) is achieved, the method for quantifying the operation comprising the steps of:

calculating a fuel heating value associated with the fossil-fired thermal system using one of the Input/Loss methods, resulting in a computed fuel heating value, supplying the DCS with the computed fuel heating value as an input signal, and controlling the fossil-fired thermal system in an improved manner through the DCS by making use of the computed fuel heating value.

5. The method of claim 4, wherein the step of calculating the fuel heating value, comprises a step of:

calculating the fuel heating value associated with the fossil-fired thermal system using The Input/Loss Method, resulting in a computed fuel heating value.

6. The method of claim 4, wherein the step of calculating the fuel heating value, comprises a step of:

calculating the fuel heating value associated with the fossil-fired thermal system using one of the Input/Loss methods which makes use of CEMS Data, resulting in a computed fuel heating value.

7. A method for quantifying the operation of a fossil-fired thermal system when being monitored by one of the Input/Loss methods through which improvement is achieved to the operation of a Boiler Master associated with controlling the thermal system, the method for quantifying the operation comprising the steps of:

calculating a Specific Energy Released from Combustion associated with the fossil-fired thermal system based on a fuel heating value determined by one of the Input/

Loss methods, resulting in a computed Specific Energy Released from Combustion, supplying the Boiler Master with the computed Specific Energy Released from Combustion as an input, and controlling the fossil-fired thermal system in an improved manner through the Boiler Master by making use of the computed Specific Energy Released from Combustion.

8. The method of claim 7, wherein the step of calculating the Specific Energy Released from Combustion, comprises a step of:

calculating the Specific Energy Released from Combustion associated with the fossil-fired thermal system based on a fuel heating value determined by The Input/Loss Method, resulting in a computed Specific Energy Released from Combustion.

9. The method of claim 7, wherein the step of calculating the Specific Energy Released from Combustion, comprises a step of:

calculating the Specific Energy Released from Combustion associated with the fossil-fired thermal system based on a fuel heating value determined by one of the Input/Loss methods which makes use of CEMS Data, resulting in a computed Specific Energy Released from Combustion.

10. A method for quantifing the operation of a fossil-fired thermal system when being monitored by one of the Input/Loss methods through which improvement to the thermal system's Distributed Control System (DCS) is achieved, the method for quantifing the operation comprising the steps of:

obtaining a boiler efficiency associated with the fossil-fired thermal system which is independent of the thermal system's fuel flow rate, obtaining a boiler absorption efficiency associated with the fossil-fired thermal system, calculating a fuel heating value associated with the fossil-fired thermal system using one of the Input/Loss methods, resulting in a computed fuel heating value, determining a Firing Correction associated with the fossil-fired thermal system, calculating a fuel flow rate associated with the fossil-fired thermal system using one of the Input/Loss methods, resulting in a computed fuel flow rate, calculating an Energy Released from Combustion associated with the fossil-fired thermal system based on the boiler efficiency, the boiler absorption efficiency, the computed fuel heating value, the Firing Correction, and the computed fuel flow rate resulting in a computed Energy Released from Combustion, supplying the DCS with the computed Energy Released from Combustion as an input signal, and controlling the fossil-fired thermal system in an improved manner through the DCS by making use of the computed Energy Released from Combustion.

11. The method of claim 10, wherein the step of calculating the fuel heating value, comprises a step of:

calculating the fuel heating value associated with the fossil-fired thermal system using The Input/Loss Method, resulting in a computed fuel heating value.

12. The method of claim 10, wherein the step of calculating the fuel heating value, comprises a step of:

calculating the fuel heating value associated with the fossil-fired thermal system using one of the Input/Loss methods which makes use of CEMS Data, resulting in a computed fuel heating value.

13. The method of claim 10, wherein the step of obtaining the boiler efficiency, comprises a step of:

calculating the boiler efficiency associated with the fossil-fired thermal system which is independent of the thermal system's fuel flow rate using The Input/Loss Method.

14. The method of claim 10, wherein the step of calculating the fuel flow rate, comprises a step of:

calculating the fuel flow rate associated with the fossil-fired thermal system using The Input/Loss Method, resulting in a computed fuel flow rate.

15. The method of claim 10, wherein the step of calculating the fuel flow rate, comprises a step of:

calculating the fuel flow rate associated with the fossil-fired thermal system using one of the Input/Loss methods which makes use of CEMS Data, resulting in a computed fuel flow rate.

16. A method for quantifying the operation of a fossil-fired thermal system when being monitored by one of the Input/Loss methods through which improvement to the thermal system's Distributed Control System (DCS) is achieved, the method for quantifying the operation comprising the steps of:

obtaining a boiler efficiency associated with the fossil-fred thermal system which is independent of the thermal system's fuel flow rate, calculating a fuel heating value associated with the fossil-fired thermal system using one of the Input/Loss methods, resulting in a computed fuel heating value, calculating a Specific Energy Released from Combustion associated with the fossil-fired thermal system based on the boiler efficiency and the computed fuel heating value resulting in a computed Specific Energy Released from Combustion, supplying the DCS with the computed Specific Energy Released from Combustion as an input signal, and controlling the fossil-fired thermal system in an improved manner through the DCS by making use of the computed Specific Energy Released from Combustion.

17. The method of claim 16, wherein the step of calculating the fuel heating value, comprises a step of:

calculating the fuel heating value associated with the fossil-fired thermal system using The Input/Loss Method, resulting in a computed fuel heating value.

18. The method of claim 16, wherein the step of calculating the fuel heating value, comprises a step of:

calculating the fuel heating value associated with the fossil-fired thermal system using one of the Input/Loss methods which makes use of CEMS Data, resulting in a computed fuel heating value.

19. The method of claim 16, wherein the step of obtaining the boiler efficiency, comprises a step of:

calculating the boiler efficiency associated with the fossil-fired thermal system which is independent of the thermal system's fuel flow rate using The Input/Loss Method.

20. A method for quantifying the operation of a fossil-fired thermal system when being monitored by one of the Input/Loss methods, through which improvement is achieved to the Distributed Control System (DCS) as used for operational control of the fossil-fired thermal system, the method for quantifying the operation comprising the steps of:

obtaining a fuel flow rate associated with the fossil-fired thermal system, calculating a fuel heating value associated with the fossil-fired thermal system using one of the Input/Loss methods, resulting in a computed fuel heating value, calculating an Energy Released from Combustion associated with the fossil-fired thermal system based on the fuel flow rate and the fuel heating value, resulting in a computed Energy Released from Combustion, supplying the DCS with the computed Energy Released from Combustion as an input, and controlling the fossil-fired thermal system in an improved manner through the DCS by making use of the computed Energy Released from Combustion.

21. The method of claim 20, wherein the step of calculating the fuel heating value, comprises a step of:

calculating the fuel heating value associated with the fossil-fired thermal system using The Input/Loss Method, resulting in a computed fuel heating value.

22. The method of claim 20, wherein the step of calculating the fuel heating value, comprises a step of:

calculating the fuel heating value associated with the fossil-fired thermal system using one of the Input/Loss methods which makes use of CEMS Data, resulting in a computed fuel heating value.

* * * * *

UNITED STATES PATENT AND TRADEMARK OFFICE
CERTIFICATE OF CORRECTION

PATENT NO. : 6,868,368 B1
DATED : March 15, 2005
INVENTOR(S) : Fred D. Lang

It is certified that error appears in the above-identified patent and that said Letters Patent is hereby corrected as shown below:

Column 2,
Line 2, delete "Control. Systems" and insert -- Control Systems --.
Line 27, delete "air flow throttle" and insert -- air flow, throttle --.
Line 28, delete "sealed, values." and insert -- scaled, values. --.
Line 55, delete "implies seamless" and insert -- then allows for seamless --.

Column 4,
Line 3, delete "fiber explained" and insert -- further explained --.

Column 5,
Line 2, delete "referenced to $T_{cal}$" and insert -- referenced to $T_{Cal}$ --.
Line 52, delete "$WF_{dry}\text{-}10=$" and insert -- $WF_{Dry\text{-}10} =$ --.

Column 6,
Line 20, delete "non-stratified gas flows)." and insert -- if stratified gas flows are present). --.
Line 33, delete "beating or cooling" and insert -- heating or cooling --.
Line 65, delete "termed $R_{Act}$ ; S)" and insert -- termed $R_{Act}$ ; 5) --.

Column 7,
Line 7, delete "yet another sunset" and insert -- yet another subset --.
Line 17, delete "and/or c!" and insert -- and/or c) --.
Line 25, delete "leading to ak" and insert -- leading to a --.

Column 9,
Line 49, delete "$\Delta HHV_{MAF\text{-}uncorr}$" and insert -- $HHV_{MAF\text{-}uncorr}$ --.

Column 10,
Equation (12), should read as follows:
$$\text{HBC} \equiv C_{p\text{-}Fuel}(T_{AF}\text{-}T_{Cal}) + (Q_{SAH} + W_{FD})/m_{AF}$$
$$+ [(h_{Amb}\text{-}h_{Cal})_{Air} a(1.0+\beta)(1.0+\Phi_{Act})N_{Air}$$
$$+ (h_{g\text{-}Amb}\text{-}h_{g\text{-}Cal})_{H2O} b_A(1.0+\beta)N_{H2O}$$
$$+ (h_{Steam}\text{-}h_{f\text{-}Cal})_{H2O} b_z N_{H2O}$$
$$+ C_{P\text{-}PLS}(T_{Amb}\text{-}T_{Cal})b_{PLS}(1.0+\gamma)N_{CaCO3}]/(xN_{AF}) \qquad (12) --.$$
Lines 62-63, delete "teaching illustration" and insert -- teaching and illustration --.

Column 11,
Line 28, delete "Btu pr pound" and insert -- Btu per pound --.

UNITED STATES PATENT AND TRADEMARK OFFICE
CERTIFICATE OF CORRECTION

PATENT NO. : 6,868,368 B1
DATED : March 15, 2005
INVENTOR(S) : Fred D. Lang

It is certified that error appears in the above-identified patent and that said Letters Patent is hereby corrected as shown below:

Column 12,
Line 28, delete "i.e., product sensible heat of non-combustion" and insert -- i.e., sensible heats of non-combustion --.
Line 50, delete "Eqs.(18) & (19)." and insert
-- Eqs.(18) & (19). A unity of value of $\eta_A$ may
  be used in applying this invention. --.

Column 13,
Equation (21B) should read as follows:
-- $ERC = m_{AF}(HHVP+HBC)\eta_{B-HHV}/\eta_A$     (21B) --.
Line 29, delete "a unity TA term." and insert -- a unity $\eta_A$ term. --.
Line 47, delete "beating value" and insert -- heating value --.

Column 14,
Line 5, delete "Eq.(21)" and insert -- Eqs.(21A) through (23). --.

Signed and Sealed this

Fourth Day of October, 2005

JON W. DUDAS
*Director of the United States Patent and Trademark Office*